UNITED STATES PATENT OFFICE 2,677,695

PROCESS FOR PREPARING 17α-HYDROXY 20-KETO STEROIDS

Eugene P. Oliveto, Long Island City, N. Y., and Emanuel B. Hershberg, West Orange, N. J., assignors to Schering Corporation, Bloomfield, N. J., a corporation of New Jersey No Drawing. Application May 29, 1951, Serial No. 228,972

21 Claims. (Cl. 260—397.4)

The present invention relates to an improved process for the manufacture of nuclearly hydroxylated steroids, and more particularly to the manufacture of 17-hydroxy saturated steroids of the 10,13-dimethyl series which are useful as intermediates in the preparation of cortisone and other therapeutically active steroids.

It is known to prepare 17-hydroxy steroids by reacting the 20-enol ester of pregnanones-20 with perbenzoic acid in benzene solution. Thus, 3,20-diacetoxy-11-keto-$\Delta^{17(20)}$pregnene has been reacted with perbenzoic acid in benzene solution whereby the 17,20-epoxide was obtained which on hydrolysis yielded 3,17($a$)-dihydroxy-11,20-diketopregnane. This procedure involved the intermediate formation of the 17,20-epoxide, which had to be hydrolyzed to yield the 17-hydroxyl derivative, the 3-acyloxy group being at the same time likewise hydrolyzed. On the other hand, when the oxidation of the 20-enol ester was carried out with peracetic acid in acetic acid solution, there was obtained a complex mixture which was quite hopeless to work up. The conversion of the 20-enol ester into the 17-hydroxy-20-keto compound has thus heretofore involved the intermediate formation of the epoxide, which required a subsequent hydrolysis, or else yielded a quite useless mass.

It is an object of the present invention to provide an improved procedure for the manufacture of 17-hydroxy-10,13 dimethyl steroids directly, that is, in a single stage, from the corresponding enol esters.

It is a further object of the invention to provide a process for the manufacture of 17-hydroxy-10,13 dimethyl steroids wherein not only perbenzoic but also peracetic, performic and other peracids can be employed and in a single step yield reaction products from which the desired hydroxylated steroids can be easily recovered in good yield.

Other objects and advantages of the invention will appear from the more detailed description hereinafter.

We have found that if the oxidation of the 20-enol ester with the peracid is effected in a two-phase reaction medium comprising an inert organic solvent for the enol ester and a second liquid which is at most only partially miscible with the inert solvent, the surprising result is obtained that the enol ester is converted directly to the keto-hydroxy steroid. This conversion apparently takes place without the intermediate formation of the epoxide, or, if the epoxide is formed, it passes quickly into the keto-hydroxy derivative.

The two-phase system can be composed of two organic liquids which are either completely immiscible with each other, or only partially so, or it can be formed of the inert organic solvent and water, the organic solvent being at most only partially soluble in the water or vice versa. The reaction with the peracid preferably takes place at room temperature and is complete in a period of a few hours.

In general, all of the peracids can be employed in our process, and it is to be noted that whereas peracetic acid in a single phase acetic acid solution gave a rather hopeless mixture, in a two phase water-benzene reaction medium it yielded readily the saturated hydroxyl derivative. The reaction preferably occurs in the presence of a small quantity of a strongly acid-reacting substance, such as mineral acids like hydrochloric and sulfuric, trichloroacetic acid, zinc chloride, aluminum chloride, potassium acid sulfate, and the like.

Among the neutral solvents that may be employed are the hydrocarbons, chlorinated solvents like chlorinated hydrocarbons, ethers, esters, and other neutral liquids. The second solvent is preferably water, and may generally comprise a mixture of water, hydrogen peroxide, and, preferably, a trace of an acid catalytic material of the type above referred to. The second solvent can include also the acid forming the peracid, so that such acid can constitute part of the solvent for the peracid. The mineral acid usually present in commercially available peracids can act as the catalyst in the reaction of the present invention.

The starting steroids of the present invention can have various substituents in the nucleus provided only that they have a keto group in the 20-position. These ketones are enolised by conversion into their enol esters and then subjected to the action of the peracid in the two-phase solvent system above referred to. The preferred compounds of the present invention are those having the carbon skeleton of pregnane or allo-pregnene.

Where the starting compound has a hydroxyl group, as in the 3-position, or any other group which is reactive toward the peracid, the same should be protected in known manner by conversion into a functional derivative which, if desired, can subsequently be reconverted into the hydroxyl or other group. Such protection can be effected in the usual manner by esterification (acetylation, benzoylation, etc.), etherification (methoxylation, benzyloxylation, etc.), and in other ways.

As already indicated, our invention provides a method whereby peracetic acid can be made to convert a steroid enol ester directly into the keto hydroxyl derivative in a simple and convenient manner. Performic and other peracids of the aliphatic series can likewise be employed. These aliphatic peracids are more convenient to use than perbenzoic acid, which is quite unstable and even explosive, and inconvenient to make.

The invention will be illustrated more specifically in the following examples which are, however, not intended to indicate the scope of the invention:

*Example I*

A solution of 3.18 g. of allopregnan-3($\beta$)-ol-20-one and 0.5 g. p-toluene sulfonic acid in 50 cc. acetic anhydride was refluxed for 4 hrs.; during this time 40 cc. of liquid were taken off. There was formed 3($\beta$),20 - diacetoxy - $\Delta^{17(20)}$ - allopregnene. The remainder of the liquid was removed in vacuo, and the residue dissolved in 30 cc. benzene. After washing the benzene solution with 10% sodium acetate solution, 5 cc. of performic acid and 1 cc. of water were added, and the two-phase mixture allowed to stand for about 2½ hrs. Ten grams of sodium sulfite were then added slowly. The benzene layer was washed twice with water, dried, and concentrated. Upon cooling, 3($\beta$)-acetoxy-allopregnan-17-($\alpha$)-ol-20-one crystallized out, M. P. 184.8–186.8° C., $(\alpha)_D + 17°$.

*Example II*

Two grams of 3($\alpha$),20-diacetoxy-$\Delta^{17(20)}$-pregnen-11-one (prepared from 3($\alpha$)-acetoxy-11,20-diketopregnane by the enol acetylation procedure described in Example I) in 10 cc. chloroform were treated with 2 cc. 40% peracetic acid, and the two phases shaken occasionally for 2 hrs. Sodium sulfite was then added, the chloroform layer washed with water and dried. The chloroform was removed by distillation and the residue was triturated with ether to extract the 3($\alpha$)-acetoxy - 17($\alpha$) - hydroxypregnan - 11,20 - dione; on evaporation of the ether, a product of M. P. 184–7° C., $(\alpha)_D + 51°$ was obtained.

It is not necessary that the peracid be accompanied, in the reaction mixture, by the parent acid of such peracid. The peracid may be accompanied, in the reaction mixture, either by the parent acid of such peracid, or by another organic acid. Thus the performic acid can be mixed with either formic or acetic or another acid; similarly, perbenzoic acid can be mixed with acetic acid, to form the second of the two phases, either with or without the presence of water. In certain cases, more than two liquid phases may exist in the reaction medium, but the additional phases will not interfere with the course of the reaction. The organic solvent forming one of the phases of the reaction medium can be any inert solvent for the enol ester. In addition to the benzene and chloroform employed in the above examples, dimethyl ether, diethyl ether, ethyl acetate, toluene, petroleum ether, and the like, may be employed.

Our process is applicable also to other enolizable ketosteroids, but the treatment of pregnanones-20 represents the preferred embodiment of our invention.

In the above examples, the peracid contains also the corresponding acid and also some water; and although the acid and peracid may be soluble in the organic solvent a large proportion thereof remains in solution in the water and forms an aqueous phase which generally is larger in volume than the water content itself. Where the peracid is substantially free from water, and together with the parent acid is soluble in the organic solvent, then a small quantity of water should be added to the reaction mixture to insure the formation of a two-phase system.

It will be noted that in both of the above examples no additional acid is employed to serve as a catalyst, since both performic and peracetic acids as commercially available generally contain some mineral acid. However, even in the absence of such mineral acid, certain peracids will not require the addition of a catalytically acting acid as the parent acid itself, such as formic, which accompanies the peracid, may be sufficiently strong to catalyze the reaction.

We claim:

1. Process for the manufacture of saturated 10,13-dimethyl-17-hydroxy steroids which comprises reacting an enol ester of a 10,13-dimethyl-20-keto steroid with a peracid in a multiphase reaction medium comprising a neutral organic solvent for the steroid compound, and a second solvent which is at most only partially miscible with the first-named solvent, said second solvent being composed at least in part of water, and recovering the 17-hydroxy steroid from the reaction mixture.

2. Process according to claim 1, wherein the starting compound is a $\Delta^{17(20)}$-20-acyloxy pregnene.

3. Process according to claim 1, wherein the starting compound is a 3,20-diacyloxy-$\Delta^{17(20)}$-pregnen-11-one.

4. Process according to claim 1, wherein the starting compound has at the 3-position a functional derivative of the hydroxyl group.

5. Process according to claim 4, wherein the starting compound is a 3,11,20-triacyloxy-$\Delta^{11,17(20)}$-steroid.

6. Process according to claim 1, wherein the reaction medium includes a small quantity of a strong acid.

7. Process according to claim 6, wherein the strong acid is a mineral acid.

8. Process according to claim 1, wherein the reaction medium includes a small quantity of p-toluene sulfonic acid.

9. Process for the manufacture of 3($\beta$)-acyloxy-allopregnane-17($\alpha$)-ol-20-one, which comprises reacting 3($\beta$),20-diacyloxy-$\Delta^{17(20)}$-allopregnene with a peracid in a two-phase reaction medium comprising an inert organic solvent for the starting compound and a second solvent which is at most only partially miscible with the first-named solvent and is composed at least in part of water.

10. Process according to claim 9, wherein the peracid is performic acid.

11. Process for the manufacture of 3($\beta$)-acyloxyallopregnane-17($\alpha$)-ol-20-one, which comprises reacting 3($\beta$),20-diacyloxy-$\Delta^{17(20)}$-allopregnene with a peracid in a two-phase reaction medium comprising water and an inert organic solvent for the starting compound which is at most only partially miscible with water.

12. Process for the manufacture of 3($\beta$)-acetoxy-allopregnane-17($\alpha$)-ol-20-one which comprises reacting 3($\beta$),20-diacetoxy-$\Delta^{17(20)}$-allopregnene with performic acid in a mixture of benzene and water, and recovering the 17-hydroxy compound from the benzene layer.

13. Process for the manufacture of 3($\alpha$)-acyloxy-17($\alpha$)-hydroxy pregnane-11,20-dione which comprises reacting $3(\alpha)$-20-diacyloxy-$\Delta^{17(20)}$-pregnen-11-one with a peracid in a two-phase reaction medium comprising an inert organic solvent for the starting material and a second solvent which is at most only partially miscible with the first-named solvent and is composed at least in part of water.

14. Process for the manufacture of $3(\alpha)$-acetoxy-$17(\alpha)$-hydroxy pregnane-11,20-dione which comprises reacting $3(\alpha),20$-diacetoxy-$\Delta^{17(20)}$-pregnene-11-one with peracetic acid in a two-phase solvent system comprising chloroform and water.

15. Process for the manufacture of hydroxylated derivatives of 20-keto and 11,20-diketo-10,13-dimethyl steroids which comprises forming the enol ester of the steroid, and reacting the enol ester with a peracid in a two-phase solvent system comprising an inert inorganic solvent for the enol ester and a second solvent which is at most only partially miscible with the first-named solvent and is composed at least in part of water.

16. Process according to claim 15, wherein the second solvent is composed entirely of water.

17. Process according to claim 15, wherein the inert solvent is a member of the group consisting of hydrocarbons, chlorinated hydrocarbons, ethers and esters.

18. Process according to claim 15, wherein, in place of the peracid and water, there are employed hydrogen peroxide, the parent acid of the peracid, and an acid-reacting catalyst.

19. Process for the manufacture of 10,13-dimethyl-17-hydroxy steroids which comprises reacting an enol ester of a 10,13-dimethyl-20-keto steroid with a peracid in a multi-phase reaction medium comprising a neutral organic solvent for the steroid compound and a second solvent which is substantially completely immiscible with the first-named solvent and is composed in part of water, and recovering the 17-hydroxy steroid from the reaction mixture.

20. Process for the manufacture of 10,13-dimethyl-17-hydroxy steroids which comprises reacting an enol ester of a 10,13-dimethyl-20-keto steroid with a peracid in a multi-phase reaction medium comprising water and a neutral organic solvent for the steroid compound which is at most only partially miscible with water and recovering the 17-hydroxy steroid from the reaction mixture.

21. Process for the manufacture of $3(\alpha)$-acetoxy-$17(\alpha)$-hydroxy pregnane-11,20-dione which comprises reacting $3(\alpha),20$-diacetoxy-$\Delta^{17(20)}$-pregnene-11-one with peracetic acid in a two-phase solvent system comprising benzene and water.

References Cited in the file of this patent

UNITED STATES PATENTS

| Number | Name | Date |
|---|---|---|
| 2,554,986 | Heyl | May 29, 1951 |
| 2,562,030 | Gallagher | July 24, 1951 |

OTHER REFERENCES

Kritchevesky et al., Jour. Bil. Chem. 179, 507–508 (1949).